United States Patent [19]

Kashima

[11] 4,295,658
[45] Oct. 20, 1981

[54] FRONT END SHOCK ABSORBING APPARATUS FOR WHEELED VEHICLE

[75] Inventor: Mitsuhiro Kashima, Gifu, Japan

[73] Assignee: Kayaba Kogyo Kabushiki Kaisha, Tokyo, Japan

[21] Appl. No.: 29,999

[22] Filed: Apr. 16, 1979

[30] Foreign Application Priority Data

Apr. 17, 1978 [JP] Japan ................... 53-45021

[51] Int. Cl.³ .............................................. B62K 25/08
[52] U.S. Cl. ................................. 280/276; 188/272; 280/703
[58] Field of Search ............... 280/276, 277, 703, 714; 188/272

[56] References Cited

U.S. PATENT DOCUMENTS

| | | | |
|---|---|---|---|
| 2,131,014 | 9/1938 | Sanford | 280/703 |
| 3,399,905 | 9/1968 | Vogel | 280/702 |
| 3,989,261 | 11/1976 | Kawaguchi | 280/276 |
| 4,145,067 | 3/1979 | Ceriani | 280/276 |

*Primary Examiner*—John P. Silverstrim
*Attorney, Agent, or Firm*—David G. Alexander

[57] ABSTRACT

A telescopic shock absorber (14) disposed between a front wheel (19) and frame (12) of a motorcycle (11) is formed with first and second fluid chambers (38), (39), hydraulic fluid flowing from the first chamber (38) to the second chamber (39) upon compression of the shock absorber (14) for shock absorption. A normally closed check valve (57) is disposed between the first and second chambers (38), (39) and urged to open by fluid pressure in the first chamber (38). The shock absorber (14) is urged to compress in response to inertial forces acting on the motorcycle (11) resulting from application of braking force applied to the motorcycle (11) by a front wheel brake (23) causing the pressure in the first chamber (38) to increase by a corresponding amount. An actuator (63) responsive to the degree of braking force increases the pressure required to open the valve (57) in such a manner as to be equal to the pressure in the first chamber (38) resulting from application of the braking force. This prevents the shock absorber (14) from being compressed by the inertial forces caused by braking, but allows the shock absorber (14) to be compressed in response to irregularities in the road surface in a normal manner so that the shock absorbing function during braking is the same as when braking is not applied. An arrangement (82), (84), (86), (89), (91) is provided to adjust the shock absorbing effect to accomodate brake wear and the individual preferences of operators.

9 Claims, 7 Drawing Figures

FRONT END SHOCK ABSORBING APPARATUS FOR WHEELED VEHICLE

BACKGROUND OF THE INVENTION

The present invention relates to a front end shock absorbing apparatus for a wheeled vehicle having a brake. Although the invention is especially suited for a motorcycle, it may be applied without significant modification to three and four wheeled motor vehicles and also to manually propelled vehicles such as bicycles.

It is desirable and well known to provide shock absorbers between the wheels and frames or chassis of wheeled vehicles such as motorcycles. The purpose of the shock absorbers is to provide a smooth ride for the vehicle operator and passengers by preventing impacts resulting from irregularities in the road surface from being transmitted from the wheels of the vehicle to the frame. Although the wheels are vertically displaced by such road surface irregularities, compression of the shock absorbers prevents the frame from being displaced by a corresponding amount.

The shock absorbers are generally tubular telescopic units which incorporate coil springs as well as hydraulic fluid chambers. Upon compression of the shock absorbers, the springs compress and also hydraulic fluid is displaced through a flow restriction from one chamber to another to absorb shocks.

Another such shock absorbers function in a satisfactory manner during constant speed operation of the motorcycle, a problem has remained heretofore unsolved during braking operation, especially abrupt braking under emergency conditions. Upon braking of the motorcycle, inertial forces cause the front end of the frame to depress relative to the front wheel and compress the front shock absorbers. Under extreme braking conditions the shock absorbers are compressed to a maximum extent. This prevents the shock absorbers from performing their intended function of absorbing road shocks, and seriously degrades the steerability of the motorcycle. This lack of steering control occurs at a time when accurate and responsive steering are most needed, and constitutes a major safety hazzard.

Several proposals have been made in the prior art for overcoming this problem, but they cannot be considered entirely satisfactory. A typical example, which constitutes the closest known prior art, is disclosed in U.S. Pat. No. 3,989,261. This reference discloses a shock absorption system which is operated in a normal manner when the motorcycle is not being braked. However, in response to a sensed braking condition, a valve is closed which blocks communication between the fluid chambers in the shock absorbers and places the shock absorbers in a condition of hydraulic lock, thereby preventing compression of the shock absorbers during braking.

Whereas this prior art system constitutes an improvement in steerability and safety during braking, it operates in an on-off manner and presents an abrupt transition from normal shock absorption to hydraulic lock at a particular sensed degree of braking force, thereby surprising and confusing the operator under emergency conditions. Other prior art systems of similar type are disclosed in Japanese application disclosure Nos. 50-97042, 51-23921, 52-16748 and 52-19850.

SUMMARY OF THE INVENTION

A shock absorbing suspension apparatus embodying the present invention for a front end of a wheeled vehicle having brake means, the apparatus including a telescopic shock absorber having a first fluid chamber and a second fluid chamber containing a fluid which is urged to flow from the first chamber to the second chamber upon compression of the shock absorber for shock absorption, is characterized by comprising valve means disposed between the first and second chambers and actuator means responsive to the brake means for controlling the valve means to progressively restrict fluid flow therethrough as a degree of braking force applied by the brake means to the vehicle increases.

A telescopic shock absorber according to the present invention disposed between a front wheel and frame of a motorcycle is formed with first and second fluid chambers, hydraulic fluid flowing from the first chamber to the second chamber upon compression of the shock absorber for shock absorption. A normally closed check valve is disposed between the first and chambers and urged to open by fluid pressure in the first chamber. The shock absorber is urged to compress in response to inertial forces acting on the motorcycle resulting from application of braking force applied to the motorcycle by a front wheel brake causing the pressure in the first chamber to increase by a corresponding amount. An actuator responsive to the degree of braking force increases the pressure required to open the valve in such a manner as to be equal to the pressure in the first chamber resulting from application of the braking force. This prevents the shock absorber from being compressed by the inertial forces caused by braking, but allows the shock absorber to be compressed in response to irregularities in the road surface in a normal manner so that the shock absorbing function during braking is the same as when braking is not applied. An arrangement is provided for adjusting the shock absorbing effect to accommodate brake wear and individual operator preferences.

It is an object of the present invention to provide a front end shock absorbing apparatus for a motorcycle or other wheeled vehicle which provides the same effective shock absorbing under all operating conditions including braking, regardless of the degree of braking force.

It is another object of the present invention to provide a shock absorbing apparatus which positively contributes to the safety of operation of a sheeled vehicle in which it is incorporated.

It is another object of the present invention to prevent depression of the handlebars of a motorcycle during braking and the resulting reduction of steerability.

It is another object of the present invention to provide a front end shock absorbing apparatus for a motorcycle which is more effective in operation than comparable apparatus available heretofore, and which may be manufactured economically and efficiently on a commercial production basis.

It is another object of the present invention to provide a shock absorbing apparatus comprising novel means for adjusting the shock absorbing effect to accommodate brake wear and individual operator preferences.

It is another object of the present invention to provide a generally improved front end shock absorbing apparatus for a wheeled vehicle.

Other objects, together with the foregoing, are attained in the embodiments described in the following description and illustrated in the accompanying drawing.

DESCRIPTION OF THE PREFERRED EMBODIMENTS

While the front end shock absorbing apparatus for a wheeled vehicle of the present invention is susceptible of numerous physical embodiments, depending upon the environment and requirements of use, substantial numbers of the herein shown and described embodiments have been made, tested and used, and all have performed in an eminently satisfactory manner.

Figure 1:
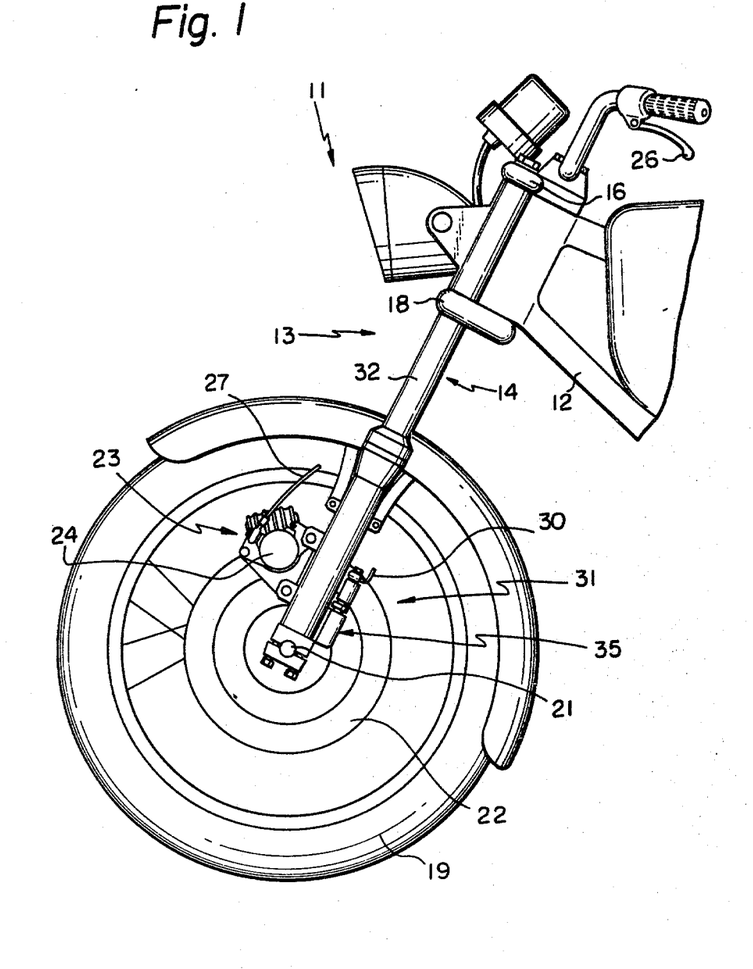
FIG. 1 is a side elevation of a front end of a motorcycle incorporating a shock absorbing apparatus embodying the present invention.

Referring now to FIG. 1 of the drawing, the front end of a motorcycle is generally designated by the reference numeral 11 and comprises a frame 12. Rigidly attached to the frame 12 is a front fork 13 which comprises two telescopic shock absorbers 14, only one of which is visible in the drawing. The shock absorbers 14 are laterally spaced from each other about the central plane of the frame 12 and extend downwardly at a predetermined angle. The shock absorbers 14 are fixed to the frame 12 by means of a top bridge 16 and a bottom bridge 18 and straddle a front wheel 19. The wheel 19 is rotatably mounted about an axle 21 which is rigidly connected at its opposite ends to the shock absorbers 14 respectively.

A disc 22 of a disc brake 23 is mounted on the front wheel 19 for integral rotation. The brake 23 comprises a hydraulically actuated caliper unit 24 which is supported by one or both of the shock absorbers 14 and embraces the disc 22. The brake 23 is engaged by means of a handlebar brake lever 26 which actuates a piston in a master cylinder (not shown). This causes the pressure in the master cylinder to increase and displace fluid to the caliper unit 24 through a high pressure actuating fluid line 27. The high pressure in the line 27 causes the caliper unit 24 to move pads (not shown) into frictional engagement with the disc 22 and thereby resist rotation of the disc 22 and wheel 19. As a result, the motorcycle 11 is braked and thereby decelerated.

A shock absorbing apparatus of the present invention is generally designated as 31 and comprises the shock absorbers 14. Each shock absorber 14 includes a fork pipe 32 which is fixed to the bridges 16 and 18 and is telescopically slidably received in a bottom case 33 which is fixed to the axle 21. Each shock absorber 14 further comprises a valve and actuator unit 35 which is connected to the high pressure line 27 through a line 30, although the connection is not explicitly illustrated.

Figure 2:
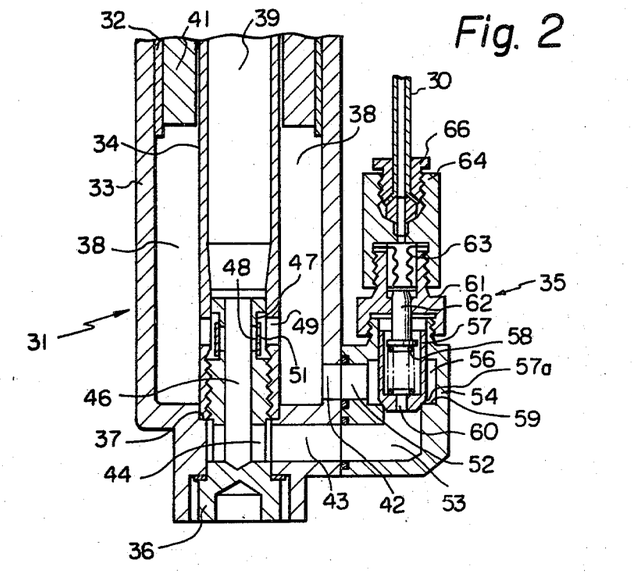
FIG. 2 is a sectional view of a shock absorber, valve and actuator embodying the present invention.

Referring now to FIG. 2, it will be seen that the shock absorber 14 further comprises an inner bottom tube 34 which is rigidly mounted in coaxial relation within the bottom case 33 by means of a bolt 36. The tube 34 is internally threaded and meshes with external threads of the bolt 36, a lower end of the tube 34 being forced against a shoulder 37 of the bottom case 33 when the bolt 36 is tightened. The bottom case 33 in combination with the bottom tube 34 define a first annular fluid chamber 38 therebetween. The interior of the bottom tube 34 defines a second fluid chamber 39.

An annular piston 41 is provided at the lower end of the fork pipe 32 which seals the upper end of the chamber 38. Upon compression of the shock absorber 14, the piston 41 moves downwardly into the bottom case 33 and increases the pressure of hydraulic actuating fluid in the chamber 38. Although not shown, the shock absorber 14 is provided with a coil spring which aids in the shock absorbing function in a conventional manner.

The chamber 38 communicates with a passageway 42 which opens external of the bottom case 33. Another passageway 43 opens external of the bottom case 33 and communicates with the chamber 39 through a radial passageway 44 and an axial passageway 46 formed through the bolt 36.

The bolt 36 is formed with an annular groove 47 through which are formed a plurality of radial holes 48 leading from the bore 46. The bottom tube 34 is formed with a plurality of holes 49 which align with the groove 47. A resilient ring 51 is disposed in the groove 47 surrounding the holes 48. The ring 51 acts as a one way valve or check valve which allows fluid flow from the chamber 39 into the chamber 38 through the holes 48 and 49 but prevents fluid flow in the reverse direction.

The unit 35 comprises a generally tubular housing 54 formed with passageways 52 and 53 which communicate with the passageways 42 and 43 and constitute extensions thereof respectively. The passageways 52 and 53 lead to a valve chamber 56.

A valve element 57 is slidably disposed in the valve chamber 56 and is urged by a compression spring 58 toward sealing engagement with a valve seat 59. A lower portion 57a of the valve element 57 which engages with the valve seat 59 is formed at an angle so that an upper part of this portion 57a extends into the valve chamber 56 when the valve element 57 abuts against the seat 59. In this condition, the valve element 57 blocks communication between the passageways 52 and 53. However, fluid pressure transmitted to the valve chamber 56 from the chamber 38, if sufficiently high to overcome the preload of the spring 58, acts on the portion 57a of the valve element 57 in the upward direction and forces the valve element 57 off the valve seat 59, thereby communicating the passageways 52 and 53 together and thereby the chambers 38 and 39.

A tubular member 61 is screwed onto the upper portion of the housing 54. An actuator rod 62 is slidably disposed in the housing 54 and member 61, with the lower end of the rod 62 engaging the upper end of the spring 58. An actuator bellows 63 having a closed and rigid lower end and an open upper end is disposed in the upper portion of the member 61, with the lower end of the bellows 63 engaging with the upper end of the actuator rod 62. The line 30 is sealingly connected to communicate with the interior of the bellows 63 by means of tubular connectors 64 and 66 which screw onto the member 61.

Assuming that the motorcycle 11 is not being braked, the pressure in the lines 27 and 30 and thereby in the bellows 63 will have a predetermined, relatively low value. The pressure in the bellows 63 will exert a downward force on the actuator rod 62 while the compression spring 58 will exert an upward force on the actuator rod 62. An equilibrium position of the actuator rod 62 will correspond to a balance of the forces of the spring 58 and bellows 63 acting thereon. The spring 58 will be compressed to a corresponding extent and will urge the valve element 57 against the valve seat 59 with a certain force. The pressure in the valve chamber 56 required to move the valve element 57 off the valve seat 59 will correspond to the preload of the spring 58 which in turn corresponds to the fluid pressure in the bellows 63.

Under these conditions, if the front wheel 19 is displaced upwardly by a bump in the road surface, the bottom case 33 will be displaced upwardly over the fork tube 34. This will cause compression of the hydraulic fluid in the chamber 38 and an elevation of the pressure in the chambers 38 and 56. When the pressure overcomes the preload force of the spring 58, the valve element 57 will be moved off the valve seat 59 thereby communicating the chambers 38 and 39 with each other through the housing 54. Fluid will then flow from the first chamber 38 into the second chamber 39 through the housing 54 and allow compression of the shock absorber 14 to absorb the displacement or shock caused by the bump.

After the front wheel 19 rides over the bump, the coil spring (not shown) in the shock absorber 14 will force the bottom case 33 and front wheel 19 downwardly to their extended positions. This causes the volume of the chamber 38 to increase and the pressure therein to drop. The reduced pressure in the valve chamber 56 allows the compression spring 58 to engage the valve element 57 with the valve seat 59. In addition, the reduced pressure causes the ring 51 to uncover the holes 48 and allow fluid to flow back into the chamber 38 from the chamber 39 through the holes 48 and 49. This prepares the shock absorber 14 to absorb another shock.

Assuming that the brake lever 26 is gripped to apply the brake 23, the pressure in the lines 27 and 30 and thereby in the bellows 63 is increased. This causes the bellows 63 to expand and move the actuator rod 62 downwardly to a lower equilibrium position at which the increased force of the spring 58 balances the pressure on the bellows 63. The increased preload of the spring 58 increases the pressure in the valve chamber 56 which is required to move the valve element 57 off the valve seat 59. In accordance with an important feature of the present invention, the preload of the spring 58 is progressively increased as the braking force is increased so that the pressure in the chamber 56 required to unseat the valve element 57 corresponds to the preload of the spring 58. The result of this operation is that the shock absorber 14 will not be compressed by inertial forces resulting from braking the motorcycle 11, but will be compressed by road shocks in a normal manner, regardless of the degree of braking force. Thus, the shock absorbing operation of the shock absorber 14 is the same whether or not the motorcycle 11 is being braked.

Since the preload of the spring 58 is increased by the bellows 63 and actuator rod 62 so as to correspond to the increase in pressure in the chamber 38 resulting from the inertial forces caused by braking the motorcycle 11, the shock absorber 14 will not be compressed by these inertial forces. However, if a bump in the road surface is encountered which displaces the front wheel 19 and thereby the bottom case 33 upwardly, the pressure in the chamber 38 will be further increased so as to overcome the preload of the spring 58 and move the valve element 57 off the valve seat 59 and communicate the chamber 39 with the chamber 38. The valve element 57 functions to restrict the flow between the chambers 38 and 39. As the braking force and pressure in the bellows 63 are increased, the valve element 57 restricts the fluid flow to a progressively greater extent.

Figure 3:
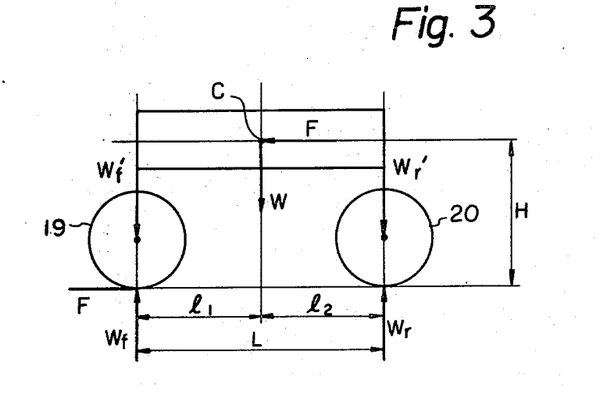
FIG. 3 is a diagram illustrating the forces acting on the motorcycle during braking.

The operation of the unit 35 will be better understood from the following mathematical analysis with reference being made to FIG. 3. The front wheel 19 is illustrated symbolically in addition to a rear wheel 20.

In the disc brake 23, the relationship between the braking pressure P and torque T may be expressed as follows.

$$T = 2n\mu PAr \ldots \quad (1)$$

where n is the number of discs, $\mu$ is the coefficient of friction between the pads and discs, A is the area of the calipers and r is the effective radius of the discs.

The relationship between the braking force F and torque T is as follows.

$$T = FR \ldots \quad (2)$$

where R is the effective radius of the wheels 19 and 20.

The relationship between the front wheel reaction force Wf and braking force F is given as follows.

$$F \leq WF \cdot \mu \ldots \quad (3)$$

where $\mu_0$ indicates the coefficient of friction between the wheel 19 and road surface.

The relation between the overall load W of the motorcycle 11 and the reaction forces at points where the front and rear wheels 19 and 20 contact the road surface is expressed as:

$$W = Wf + Wr \ldots \quad (4)$$

where Wr represents the rear wheel reaction force.

The forces exerted by the wheels 19 and 20 on the road surface are designated as Wf' and Wr' respectively.

The balance of moments during braking about the point of contact of the front wheel 19 with the road surface is represented by:

$$FH = Wl_1 = WrL \ldots \quad (5)$$

where L is the distance between the points of contact of the front and rear wheels 19 and 20 with the road, $l_1$ is the distance between the center of gravity C and point of contact of the front wheel 19 with the road, $l_2$ is the distance between the center of gravity C and the point of contact of the rear wheel 20 with the road surface, and H is the height of the center of gravity C.

From equations (5) and (4), we obtain:

$$FH = Wl_1 - (W - Wf)L$$
$$= WfL - Wl_2$$

Therefore, $$Wf = \frac{FH + Wl_2}{L} \qquad (6)$$

Equation (6) may be rewritten as:

$$Wf = \frac{H}{L} F + \frac{l_2}{L} W = \frac{H}{L} F + Wfo \qquad (7)$$

where Wfo is the front wheel reaction force under static conditions. From equations (2) and (7), an increase $\Delta Wf$ in the front wheel load upon braking is expressed as:

$$\Delta Wf = \frac{H}{L} F = \frac{H}{L} \cdot \frac{T}{R} \qquad (8)$$

since the reaction force component $\Delta Wf = (H/L)F$ and the static load component $Wfo = (l_2/L)W$ in equation (7). Further, from equation (8) and (1), $$\Delta Wf = \frac{H}{L} \cdot \frac{r}{R} 2\mu nAP \qquad (9)$$

With the increase $\Delta Wf$ in the front wheel reaction force where the shock absorbers 14 are inclined by an angle $\theta$, the fluid pressure Pf in the chambers 38 is equal to:

$$Pf = \frac{\Delta Wf \cos\theta}{2Af} = \frac{Hr2\mu nA\cos\theta \cdot P}{2AfLR} = \frac{AHr}{AfLR} \cos\theta \cdot \mu nP \qquad (10)$$

where Af represents the effective cross-sectional area of the fluid chambers 38 in both shock absorbers 14. Therefore, to just maintain the internal pressure Pf, the opening pressure Po of the valve element 57 which corresponds to the preload of the spring 58 must be equal to Pf.

Lumping together all constants as a single constant K, equation (10) reduces to:

$$Po = KP \ldots \qquad (11)$$

Equation (11) produces the important result that the pressure Pf in the chambers 38 resulting from compression of the fluid therein caused by inertial forces arising from braking the motorcycle 11 is proportional to the braking pressure P which is applied by the brake 23 to the wheel 19. The pressure in the lines 27 and 30 and thereby in the bellows 63 is also proportional to the pressure P and produces a proportional increase in the preload of the spring 58 which is proportional to the pressure Po required to move the valve element 57 off the valve seat 59 against the force of the spring 58. Thus, the shock absorbers 14 are automatically prevented from being compressed due to braking forces although they are able to absorb even small shocks from the road surface in a normal and advantageous manner. This is accomplished by selection of the dimensions of the valve element 57, spring 58 and bellows 63 in accordance with equation (11).

Figure 4:
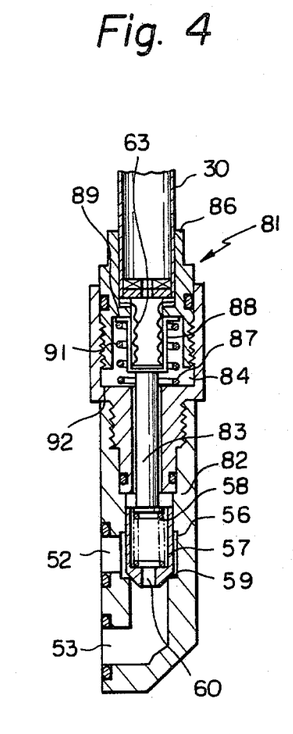
FIG. 4 is a sectional view of another valve and actuator of the present invention.

FIG. 4 illustrates another valve and actuator unit 81 which may be used to replace the unit 35 and which comprises means for adjusting the relationship between braking force and shock absorption. Like elements are designated by the same reference numerals in the description which follows.

As the pads in the brake 23 gradually wear out, a greater braking force is required to produce the same braking effect. If no adjustment is made to the unit 35, the shock absorbing operation of the shock absorbers 14 will gradually decrease by a corresponding extent. This is because the pressure in the chambers 38 will not increase as rapidly as the pressure in the bellows 63 and the preload of the spring 58 will be increased during braking to an extent which is higher than the corresponding pressure in the chambers 38. As a result, the shock absorbers 14 will gradually become unable to absorb small shocks during braking.

In addition, various motorcycle operators have different preferences regarding the degree of shock absorption. Some operators prefer a very smooth ride which results from a high degree of shock absorption. Other operators prefer to get a "feel" of the road surface which results from a lower degree of shock absorption. The unit 81 is able to provide both of these functions.

The unit 81 comprises a housing 82 formed with the passageways 52 and 53. The valve element 57 and spring 58 are disposed in the housing 82. It will be noted that the valve element 57 may be formed with a lower opening 60 in order to facilitate operation during slow movement of the piston 41. In addition, the ring 51 and holes 48 and 49 may be eliminated if a check valve or leakage path (not shown) is provided between the chambers 38 and 39 allowing return fluid flow when the shock absorber 14 is expanded.

A tubular member 84 is screwed partially into the housing 82 in which an actuator rod 83 is slidably supported. Another tubular member 86 which serves as a connector for the line 30 is partially screwed into the tubular member 84. The threaded connections between the housing 82 and tubular members 84 and 86 have the same direction and pitch.

The members 84 and 86 define therein a spring chamber 87 in which is disposed a cup shaped sleeve 88. Although not individually designated, the sleeve 88 is formed with a closed lower end which engages with the actuator rod 83 and a flange formed at an open upper end which abuts against a shoulder 89 of the member 86 which constitutes a stop. The sleeve 88 is urged into engagement with the shoulder 89 by the spring 58 and also by an adjustment compression spring 91 which engages with the lower surface of the flange of the sleeve 88 at its upper end and with a shoulder 92 of the member 84 at its lower end. The shoulder 92 constitutes a spring seat. The bellows 63 is disposed in the sleeve 88 in such a manner that the lower end of the bellows 63 engages with the inner surface of the lower closed end of the sleeve 88 and the interior of the bellows 63 communicates with the line 30.

Under non-braking conditions, the compression spring 58 urges the sleeve 88 into engagement with the shoulder 89 by means of the actuator rod 83. The spring 91 is extended to a maximum possible extent and does affect the operation of the unit 81.

When a braking force is applied, the bellows 63 expands and urges the sleeve 88 and actuator rod 83 downwardly. In this case, the pressure in the bellows 63 opposes the force of the spring 91 in addition to the force of the spring 58. The greater the force of the spring 91, the greater the resistance to movement of the actuator rod 83 and the lower the effective preload of the spring 58. This corresponds to an increased shock absorbing ability of the shock absorber 14 during braking.

The preload of the spring 91 and thereby the preload of the spring 58 during braking may be easily adjusted to compensate for wear of the brake 23 or the individual preference of the operator by merely rotating the tubular member 84 while holding the housing 82 and tubular member 86 stationary. Since the member 84 is threaded to the housing 82 and member 86 in an identical manner, it may be screwed upwardly and downwardly relative thereto without moving the sleeve 88, actuator rod 83 and spring 58. Screwing the member 84 upwardly will compress the spring 91 and increase the shock absorbing ability, and vice-versa. Thus, adjustment of the spring 91 may be made without disturbing the setting of the spring 58. Another benefit of the sleeve 88 is that it relieves all stress from the bellows 63 when the pressure in the bellows 63 is very low. This increases the durability of the assembly and prolongs the operating life of the bellows 63.

In some applications it is desirable to replace the bellows 63 with a plunger in such a manner that the brake fluid pressure acts directly on the plunger. Since the bellows 63 is a relatively expensive and non-durable item, it is desirable to replace it with an inexpensive and durable plunger whenever possible. It will of course be understood that within the scope of the present invention the bellows 63 may be replaced by any type of actuator means such as a diaphragm which increases the flow resistance of the valve as the braking force increases. Such an actuator means may be mechanical where the motorcycle is fitted with a mechanical, rather than a hydraulic brake.

Figure 5:
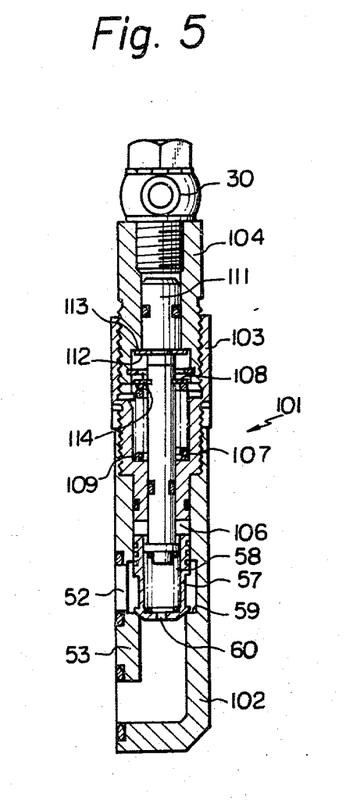
FIG. 5 is a sectional view of another valve and actuator of the present invention.

Another unit 101 embodying the present invention is illustrated in FIG. 5 and comprises a housing 102. A tubular member 103 is partially screwed into the housing 102 and a tubular member 104 is partially screwed into the member 103 in the manner of FIG. 4. An actuator rod 106 is slidably received in the housing 102 and member 103. A compression spring 107 is compressed between a snap ring 108 fitted on the plunger 106 and a shoulder 109 of the member 103.

A plunger 111 is disposed in the member 104 in such a manner that the upper end of the plunger 111 is exposed to fluid pressure from the line 30. The lower end of the plunger 111 engages with the upper end of the actuator rod 106. A snap ring 112 fitted to the plunger 111 is arranged to abut against a shoulder 113 of the member 104 which constitutes a stop when the pressure in the line 30 is low. Yet another snap ring 114 is fitted in a groove in the inner surface of the member 104. The snap ring 112 abuts against the snap ring 114 when the pressure in the line 30 is very high to provide a maximum preload for the spring 58.

The operation of the unit 101 is essentially similar to that of the units 35 and 81 except that the pressure in the line 30 is transmitted to the actuator rod 106 by the plunger 111 rather than the bellows 63. The constant K in equation (11) may be optimally determined by selection of the diameter of the plunger 111. Under non-braking conditions when the pressure in the line 30 is very low, the actuator rod 106 is urged upwardly by the springs 59 and 107 so that the plunger 111 is also urged upwardly and the snap ring 112 abuts against the shoulder 113 preventing further upward movement of the rod 106 and plunger 111. Rotation of the tubular member 103 while holding the housing 102 and member 104 stationary against rotation allows the preload of the spring 58 during braking to be adjusted in the manner described above. Various O-ring seals are illustrated but not designated by reference numerals.

Figure 6:
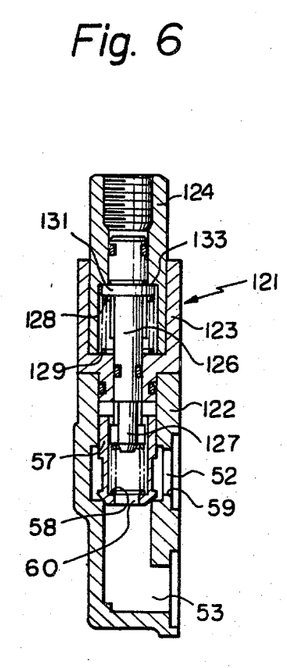
FIG. 6 is a sectional view of another valve and actuator of the present invention.

FIG. 6 illustrates a modified embodiment of the present invention which is designated as 121. The unit 121 comprises a housing 122, a tubular member 123 and a tubular member 124 which are screwed together in the manner described above. In this case, the lower end of an elongated plunger 126 engages with the upper end of a shortened actuator rod 127. A compression spring 128 is disposed between a shoulder 129 of the member 123 and step or a land 131 of the plunger 126. The springs 59 and 128 urge the plunger 126 and actuator rod 127 upwardly so that the land 131 engages with a shoulder 132. The operation of the unit 121 is essentially similar to that of the unit 101.

Figure 7:
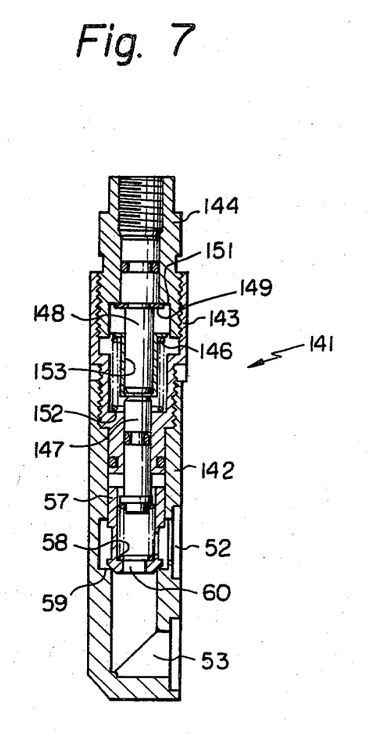
FIG. 7 is a sectional view of yet another valve and actuator of the present invention.

Another unit 141 embodying the present invention is illustrated in FIG. 7 and comprises a housing 142 and tubular members 143 and 144 which are screwed together in the manner described above to allow adjustment of a spring 146. An actuator rod 147 and plunger 148 serve the same functions as in the other embodiments. A snap ring 149 is fitted on the plunger 148 to abut against a shoulder 151 of the member 144 when the pressure in the line 30 is very low.

The spring 146 is compressed between a shoulder 152 of the member 143 and a flange of a sleeve 153 which is essentially similar to the sleeve 88. The lower closed end of the sleeve 153 engages at its lower and upper surfaces with the actuator rod 147 and plunger 148 respectively. The flange of the sleeve 153 does not, in this case, provide an upward movement stop function since this function is provided by the snap ring 149. However, the sleeve 153 does provide a downward movement stop function since it has a larger diameter than the actuator rod 147 and is adapted to abut against the shoulder 152.

In summary, it will be seen that the present invention provides a front end shock absorbing apparatus for a motorcycle or the like which ensures that the shock absorption will be the same regardless of whether or not the motorcycle is being braked, thus substantially increasing the safety and steerability of the motorcycle under emergency conditions. In addition, means are provided to adjust the shock absorbing effect to compensate for wear of brakes or the individual preferences of motorcycle operators. Various modifications will become possible for those skilled in the art after receiving the teachings of the present disclosure without departing from the scope thereof.

What is claimed is:

1. A shock absorbing suspension apparatus for a front end of a wheeled vehicle having brake means, the apparatus including a telescopic shock absorber having a first fluid chamber and a second fluid chamber containing a fluid which is urged to flow from the first chamber to the second chamber upon compression of the shock absorber for shock absorption, wherein the improvement comprises:

valve means disposed between the first and second chambers;

actuator means responsive to the brake means for controlling the valve means to progressively restrict fluid flow therethrough as a degree of braking force applied by the brake means to the vehicle increases;

the valve means comprising a check valve which is normally closed and urged to open by fluid pressure in the first chamber, the actuator means being constructed to progressively increase a pressure required to open the check valve as the degree of braking force increases;

the brake means comprising a fluid pressure actuated brake and a high pressure line for supplying high pressure actuating fluid to the brake, the actuator means being connected to the high pressure line and constructed so as to increase the pressure required to open the check valve as the actuating fluid pressure increases;

the valve means comprising a valve element and a compression spring urging the valve element toward a closed position, the actuator means comprising an actuator rod, the actuator rod being urged by the high pressure actuating fluid to compress the compression spring;

the actuator means further comprising a stop, the compression spring urging the actuator rod toward engagement with the stop; and an adjustment spring urging the actuator rod toward the stop and adjustment means for adjusting a force exerted by the adjustment spring on the actuator rod.

2. An apparatus as in claim 1, in which the adjustment means comprises a first tubular member in which the actuator rod is slidably disposed, a second tubular member having a portion with which a first end of the adjustment spring engages, a second end of the adjustment spring engaging with the actuator rod, and a third tubular member defining the stop, the first, second and third tubular members being threadingly connected together in such a manner that the second tubular member may be axially screwed relative to the first and third tubular members while the first and third tubular members are held stationary and the portion of the second tubular member with which the first end of the adjustment spring engages is moved relative to the stop.

3. An apparatus as in claim 2, in which the adjustment spring is a compression spring.

4. An apparatus as in claim 1, in which an end of the actuator rod engages with the compression spring and another end of the actuator rod is exposed to actuating fluid from the high pressure line.

5. An apparatus as in claim 1, in which the shock absorber is urged to compress in response to inertial forces acting on the vehicle resulting from application of braking force to the vehicle by the brake means causing the pressure in the first chamber to increase by a corresponding amount, the actuator means increasing the pressure required to open the valve in such a manner as to be substantially equal to the pressure in the first chamber resulting from application of the braking force to the vehicle by the brake means.

6. An apparatus as in claim 1, in which the actuator means further comprises a bellows, an interior of the bellows communicating with the high pressure line, an end of the actuator rod engaging with the compression spring and another end of the actuator rod engaging with the bellows.

7. A shock absorbing suspension apparatus for a front end of a wheeled vehicle having brake means, the apparatus including a telescopic shock absorber having a first fluid chamber and a second fluid chamber containing a fluid which is urged to flow from the first chamber to the second chamber upon compression of the shock absorber for shock absorption, wherein the improvement comprises:

valve means disposed between the first and second chambers;

actuator means responsive to the brake means for controlling the valve means to progressively restrict fluid flow therethrough as a degree of braking force applied by the brake means to the vehicle increases;

the valve means comprising a check valve which is normally closed and urged to open by fluid pressure in the first chamber, the actuator means being constructed to progressively increase a pressure required to open the check valve as the degree of braking force increases;

the brake means comprising a fluid pressure actuated brake and a high pressure line for supplying high pressure actuating fluid to the brake, the actuator means being connected to the high pressure line and constructed so as to increase the pressure required to open the check valve as the actuating fluid pressure increases;

the valve means comprising a valve element and a compression spring urging the valve element toward a closed position, the actuator means comprising an actuator rod, the actuator rod being urged by the high pressure actuating fluid to compress the compression spring; and a stop and a cup shaped sleeve disposed between the actuator rod and the stop, the compression spring urging the sleeve toward engagement with the stop, an adjustment spring urging the sleeve toward engagement with the stop and adjustment means for adjusting a force exerted by the adjustment spring on the sleeve.

8. An apparatus as in claim 7, in which the sleeve is formed with a closed end which engages with the actuator rod and an opposite open end, flange being formed at the open end which engages with the stop.

9. An apparatus as in claim 8, in which the actuator means further comprises a bellows communicating with the high pressure line and being disposed in the sleeve.

* * * * *